(No Model.)

H. F. BELCHER.
METHOD OF MOUNTING PRISM LIGHTS AND ORNAMENTAL GLASS.

No. 586,227. Patented July 13, 1897.

Witnesses:
Harry R. L. White,
Donald M. Carter

Inventor:
Henry F. Belcher,
By Francis W. Parker,
Attorney

UNITED STATES PATENT OFFICE.

HENRY F. BELCHER, OF NEW YORK, N. Y., ASSIGNOR TO THE LUXFER PRISM PATENTS COMPANY, OF CHICAGO, ILLINOIS.

METHOD OF MOUNTING PRISM-LIGHTS AND ORNAMENTAL GLASS.

SPECIFICATION forming part of Letters Patent No. 586,227, dated July 13, 1897.

Application filed April 19, 1897. Serial No. 632,703. (No specimens.)

*To all whom it may concern:*

Be it known that I, HENRY F. BELCHER, a citizen of the United States, residing at New York, in the county of New York and State of New York, have invented certain new and useful Improvements in Methods of Mounting Prism-Lights and Ornamental Glass, of which the following is a specification.

My invention relates to methods of mounting prism-lights, and has for its object to provide means therefor.

It is illustrated in the accompanying drawings, wherein—

Figure 1:
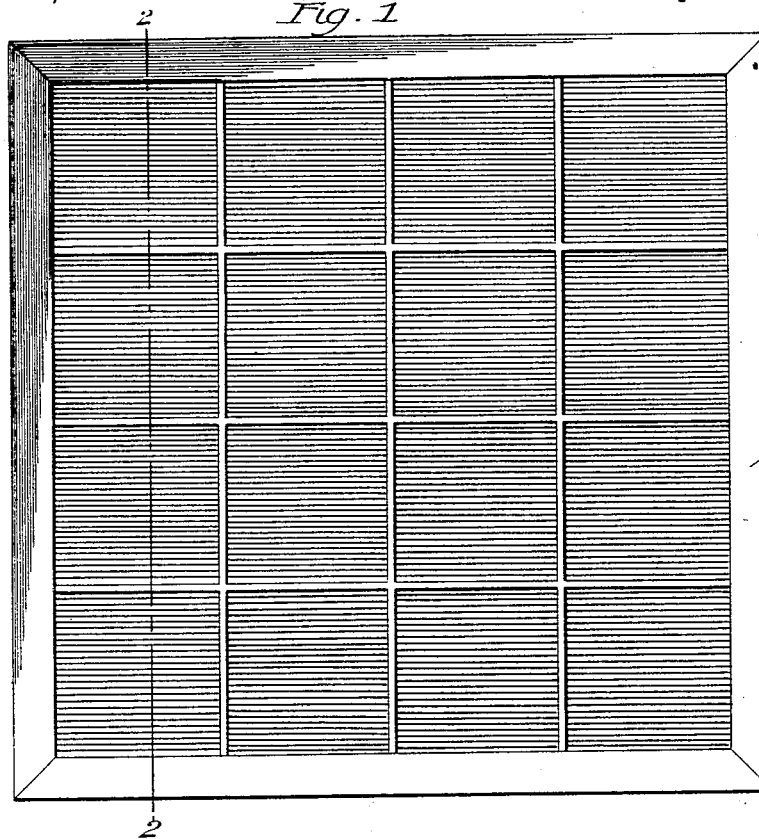
Figure 2:
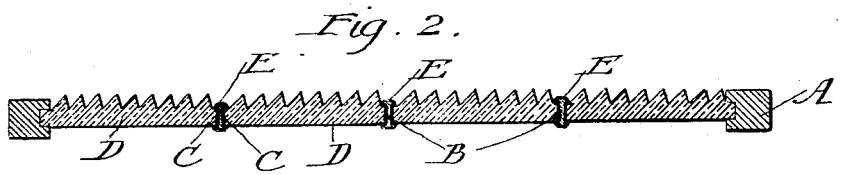
Figure 3:
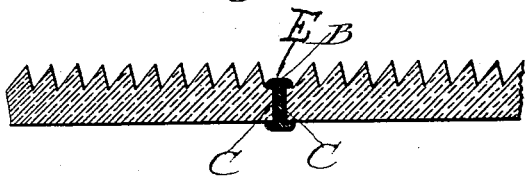

Figure 1 is an elevation of a prism-plate. Fig. 2 is a cross-section on the line 2 2 of Fig. 1. Fig. 3 is an enlarged detailed cross-section.

Like parts are indicated by the same letter in all the figures.

A is the sash-border or mounting-frame; B B, the members of the frame or grid, and such members may be composed of lead bars channeled in the usual manner.

C C are quantities of cement, preferably conducting-cement, and perhaps preferably all plumbago or a compound thereof.

D are prism-lights; E E, coverings of electrically-deposited metal which surrounds the exposed surfaces of the bars and cement.

I have spoken of "prism-lights," but obviously any kind of sections—for example, ornamental-glass sections—can be united in this manner to form the complete plate or window. The paste or cement commonly employed to make a tight joint between the metal bars of the grid or frame and the edges of the glass sections is liable to run and is long in hardening and has various other objectionable qualities, which lead to additional expense in mounting or cleaning the glass when mounted, and which things result in detracting from its appearance, its permanency, and its value for the purposes for which it was intended. I obviate these difficulties by electroplating onto the cement, using for that purpose, preferably, an electrically-conducting cement, or a cement when in position may have applied to it a conducting-surface, so that the upper or exposed portion of the cement will be a conductor, and will thus serve when the whole is placed in the bath to cause a deposit of metal thereon.

I claim—

1. A plate consisting of a series of sections united by means of a grid, a paste interposed between the grid and the sections, and an electrically-deposited coat of metal over the exposed surfaces of such cement.

2. A plate consisting of a series of sections united by means of a grid, a paste interposed between the grid and the sections, and an electrically-deposited coat of metal over the exposed surfaces of such cement and over the exposed surfaces of the grid also.

HENRY F. BELCHER.

Witnesses:
DONALD M. CARTER,
BERTHA C. SIMS.